United States Patent Office 2,828,329
Patented Mar. 25, 1958

2,828,329

PROCESS FOR PREPARING MONOALKYLAMINO-ALKYL ALKOXYAMINOBENZOATES

Morris Freifelder, Waukegan, Ill., assignor to Abbott Laboratories, North Chicago, Ill., a corporation of Illinois No Drawing. Application March 7, 1955
Serial No. 492,768

10 Claims. (Cl. 260—472)

This invention relates to the preparation of monoalkylaminoalkyl esters and to the ester prepared by the improved process.

In the preparation of mono-N-substituted aminoalkyl esters, such as the benzoates or substituted benzoates, by reacting a mono-N-substituted aminoalkanol with an acyl halide, such as benzoyl halides or substituted benzoyl halides, considerable difficulty has been heretofore encountered because of the large amounts of impurities formed. In acylating a mono-N-substituted aminoalkanol with an acyl halide, such as benzoyl chloride, benzoyl bromide or substituted benzoyl halides, there is a marked tendency for the acyl halide to react with the amino group of the said aminoalkanol to form an amide instead of the desired ester product. Heretofore it has been necessary to pass excess hydrogen chloride into the reaction mixture for an extended period of time to suppress formation of the undesirable amides or effect a rearrangement of the amide to the ester in order to insure substantial yields of the mono-N-substituted esters. In many instances, however, despite the foregoing procedure, the amide is formed as the predominant reaction product instead of the desired ester.

It is therefore an object of the present invention to provide an improved method of preparing monoalkylaminoalkyl esters without producing substantial amounts of the corresponding amide.

It is another object of the invention to provide an improved method of preparing monalkylaminoalkyl benzoates and monoalkylaminoalkyl substituted benzoates.

Other objects of the invention will be apparent from the following detailed description and claims.

It has been found that monoalkylaminoalkyl esters in highly purified form substantially free of the corresponding amide products can be prepared in an economical manner by introducing a hydrogenolyzable group into a monoalkylaminoalkanol on the nitrogen atom thereof, such as benzylating the said aminoalkanol, and thereafter reacting the thus substituted aminoalkanol with the desired acylating agent, such as benzoyl chloride. The foregoing reaction product is then subjected to a reducing atmosphere in which the said benzyl or other hydrogenolyzable group is removed from the nitrogen atom of the amino group and replaced by hydrogen to form a desired mono substituted alkylaminoalkyl ester. Among the hydrogenolyzable groups which have been found highly satisfactory in the present invention are the benzyl group and carbobenzoxy group although other groups which are equally useful and which will be specifically discussed hereinafter will be readily apparent to one skilled in the art.

In one form of the present invention an aminoalkanol is first alkylated to provide the desired monoalkyl substituted aminoalkanol and thereafter the monoalkyl substituted aminoalkanol is catalytically reductively alkylated by reacting with benzaldehyde or a substituted benzaldehyde to provide the nitrogen atom of the said aminoalkanol with a hydrogenolyzable group which protects the amino group when the said alkanol is reacted with the desired acyl halide to form an ester. It is also within the scope of the present invention, however, to react an aminoalkanol with benzaldehyde or a substituted benzaldehyde to form an N-benzylaminoalkanol and thereafter alkylating the said benzylaminoalkanol to introduce therein the desired monoalkyl substituent in the usual manner. In another procedure for preparation of benzylalkylaminoalkanols, benzylalkylamine compounds are reacted with alkylene oxides such as ethylene oxide, propylene oxide and the like to form benzylalkylaminoethanol, benzylalkylaminoisopropanol. The aminoalkanol can also be provided with other hydrogenolyzable groups, such as benzhydryl, α- or β-menaphthyl, nuclear substituted carbobenzoxy such as p-bromcarbobenzoxy, carbo-allyloxy, and carbobenzoxy, as by reacting the aminoalkanol or N-monoalkylaminoalkanol with carbobenzoxy chloride to form the N-alkyl-N-carbobenzoxyaminoalkanol which has the amino group protected by the hydrogenolyzable carbobenzoxy group, thereby enabling the said alkanol to be reacted with benzoyl chloride or a substituted benzoyl chloride or any other acyl halide to form an ester without forming the undesired amide product.

In the following specific examples are shown several specific embodiments of the present invention but it should be understood that the invention is not to be limited to the specific reactions disclosed nor to the precise proportions or conditions set forth in the several specific examples, since the examples are given only for the purpose of illustrating the principle of the present invention.

EXAMPLE I 2-(n-propylamino)ethyl 4-methoxybenzoate hydrochloride

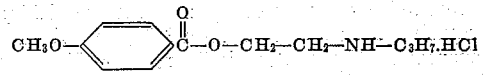

(a) 2-(benzyl-n-propylamino)ethanol: To 75.5 g. 2-(benzylamino)ethanol (0.5 mole) dissolved in 50 cc. methanol is added 58 g. propionaldehyde (1.0 mole). The solution is refluxed for 20 minutes and concentrated under reduced pressure to remove volatile materials. Thereafter 50 cc. methanol is added to the residue and the solution is hydrogenated under a pressure of 50 pounds per square inch in the presence of platinum oxide. Upon the completion of the reduction, the reaction mixture is filtered and the product, 2-(benzyl-n-propylamino)ethanol, is distilled at a temperature of 155–165° C. under a pressure of 22 mm. and exhibits a refractive index of $n_D^{25}$ 1.5110. Upon analysis the said aminoethanol product is found to contain 74.90% C, 9.84% H, and 6.98% N, as compared with theoretical values of 74.57% C, 9.91% H, and 7.25% N.

(b) 2-(benzyl-n-propylamino)ethyl 4-methoxybenzoate hydrochloride: 2-(benzyl-n-propylamino)ethanol (29.5 g.) prepared in the foregoing manner is dissolved in 50 cc. of benzol, heated and stirred for a period of 30 minutes with 25.6 g. of anisoyl chloride dissolved in 100 cc. of benzol. The mixture is then stirred and refluxed for four hours and allowed to stand approximately 12 hours. The reaction mixture is heated to remove the solvent from the reaction mixture and a non-crystalline residue, 2-(benzyl-n-propylamino)ethyl 4-methoxybenzoate hydrochloride, is obtained.

(c) 2-(n-propylamino)ethyl 4-methoxybenzoate hydrochloride: 2-(benzyl-n-propylamino)ethyl 4-methoxybenzoate hydrochloride (54.3 g.), the product of Example Ib, is dissolved in 150 cc. of ethyl alcohol and is thereafter hydrogenated under a pressure of 50 pounds per square inch in the presence of 5.0 g. of 5% palladium on charcoal until reduction is complete, usually requiring several hours under the foregoing conditions. Thereafter water is added to the reduction mixture to dissolve the product which comprises the hydrochloride salt of 2-(n-propylamino)ethyl 4-methoxybenzoate. The product is filtered and concentrated under reduced pressure and thereafter purified by dissolving in isopropyl alcohol and adding dry ether to precipitate the purified 2-(n-propylamino)ethyl 4-methoxybenzoate hydrochloride which has a melting point of 148.5° C. On chemical analysis the product is found to contain 56.90% C, 7.27% H, and 5.20% N, as compared with theoretical values of 57.01% C, 7.36% H, and 5.11% N.

EXAMPLE II

*2-(n-propylamino)ethyl 3-amino-4-n-butoxybenzoate hydrochloride*

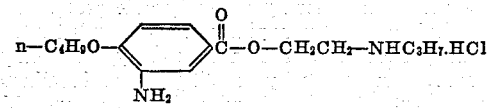

(a) 2-(benzyl-n-propylamino)ethyl 3-nitro-4-n-butoxybenzoate hydrochloride: 2-(benzyl-n-propylamino)ethanol (0.1 mole), prepared as in Example I(a), is dissolved in benzol and thereafter refluxed with stirring with 0.1 mole of 3-nitro-4-n-butoxybenzoyl chloride for about three hours and the reaction mixture is allowed to stand for about 12 hours. The product, 2-(benzyl-n-propylamino)ethyl 3-nitro-4-n-butoxybenzoate hydrochloride, which forms as a crystalline solid melts after recrystallization from isopropanol and dry ether at 115–117° C., and on chemical analysis is found to contain 61.43% C, 7.21% H, and 6.06% N, as compared with theoretical values of 61.25% C, 6.93% H, and 6.21% N.

(b) 2-(n-propylamino)ethyl 3-amino-4-n-butoxybenzoate hydrochloride: 2-(benzyl-n-propylamino)ethyl 3-nitro-4-n-butoxybenzoate hydrochloride (25 g.) is dissolved in 200 cc. of water and 25 cc. of ethyl alcohol and the solution is hydrogenated under a pressure of 32 pounds per square inch in the presence of 3.0 g. of 5% palladium on charcoal. The mixture is filtered, the filtrate treated with benzol and thereafter made alkaline with sodium hydroxide solution. The solution is then extracted with benzol and dried over magnesium sulfate. After filtering the solution, about 0.056 mole of alcoholic hydrochloric acid is added thereto and it is allowed to stand until precipitation is complete. The precipitate is filtered, washed with dry ether and dried thoroughly. The product, 2-(n-propylamino)ethyl 3-amino-4-n-butoxybenzoate hydrochloride, upon recrystallization from ethyl alcohol and thorough drying, has a melting point of 141–142° C. On chemical analysis the said product is found to contain 57.67% C, 7.90% H, and 8.01% N, as compared with theoretical values of 58.08% C, 8.22% H, and 8.47% N.

EXAMPLE III

*2 - (cyclohexylamino)ethyl 3 - amino - 4 - n - butoxybenzoate hydrochloride*

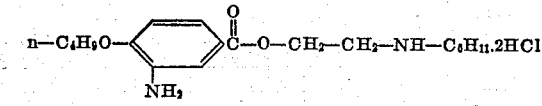

(a) 2-(cyclohexylbenzylamino)ethanol is prepared by reacting 2-(benzylamino)ethanol with cyclohexanone and thereafter subjecting the reaction product to hydrogenation in accordance with Example I(a). The product is found to have a boiling point of 207° C. at a pressure of 22 mm. and has a refractive index of $n_D^{25}$ 1.5287. On chemical analysis the said product is found to contain 77.34% C, 10.01% H, and 5.99% N, as compared with theoretical values of 77.20% C, 9.93% H, and 6.00% N.

(b) 2 - (benzylcyclohexylamino)ethyl 3 - nitro - 4 - n - butoxybenzoate hydrochloride is prepared by reacting 3-nitro-4-n-butoxybenzoyl chloride with 2-(benzylcyclohexylamino)ethanol in the same manner as in Example II to give a product having a melting point of 105–109° C. On chemical analysis the said product is found to contain 5.63% N, as compared with a theoretical value of 5.85% N.

(c) 2 - (cyclohexylamino)ethyl 3 - amino - 4 - n - butoxybenzoate dihydrochloride is obtained by catalytically reducing the 3-nitro-4-n-butoxybenzoate product of Example III in the same manner as described in Example II. The said amino product melts at 211–212.5° C. with decomposition. On chemical analysis the said product is found to contain 56.26% C, 7.71% H, and 6.88% N, as compared with theoretical values of 56.01% C, 7.92% H, and 6.88% N.

EXAMPLE IV

*1-(methylamino)-2-propyl 3-amino-4-n-butoxybenzoate hydrochloride*

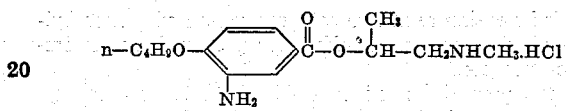

(a) 1-(benzylmethylamino)-2-propanol is prepared by reacting 1-(benzylamino)-2-propanol with formaldehyde and subjecting the reaction product to hydrogenation as in Example I(a). The product has a boiling point of 127–128° C. at a pressure of 13 mm. and has a refractive index of $n_D^{25}$ 1.5087. On chemical analysis the product is found to contain 73.80% C, 9.60% H, and 7.88% N, as compared with theoretical values of 73.70% C, 9.56% H, and 7.81% N.

(b) 1-(benzylmethylamino) - 2 - propyl 3-nitro-4-n-butoxybenzoate hydrochloride is prepared as in Example II(a) by reacting 3-nitro-4-n-butoxybenzoyl chloride in benzol with 1-(benzylmethylamino)-2-propanol and is found to have a melting point of 78–83° C. On chemical analysis the product is found to contain 6.23% N, as compared with a theoretical value of 6.41% N.

(c) The product 1-(methylamino)-2-propyl 3-amino-4-n-butoxybenzoate monohydrochloride is prepared as in Example I(c) by subjecting the 1-(benzylmethylamino)-2-propyl 3-nitro-4-n-butoxybenzoate hydrochloride to hydrogenation to give the product having a melting point of 138–140° C. On chemical analysis the product is found to contain 56.91% C, 7.78% H, and 8.99% N, as compared with theoretical values of 56.86% C, 7.95% H, and 8.84% N.

EXAMPLE V

*3-(methylamino)-1-propyl 3-amino-4-n-butoxybenzoate hydrochloride*

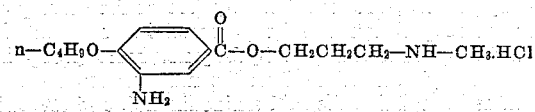

(a) 3-(benzylmethylamino)-1-propanol is prepared as in Example I by reacting 3-(benzylamino)propanol with formaldehyde and reducing the reaction product in a hydrogen atmosphere. The product has a boiling point of 143–147° C. at a pressure of 11 mm. and a refractive index of $n_D^{25}$ 1.5216. On chemical analysis the product is found to contain 73.96% C, 9.26% H, and 7.67% N, as compared with theoretical values of 73.70% C, 9.56% H, and 7.81% N.

(b) 3-(benzylmethylamino) - 1 - propyl 3-nitro-4-n-butoxybenzoate hydrochloride is prepared as in Example II(a) by reacting 3-nitro-4-n-butoxybenzoylchloride with 3-(benzylmethylamino)-1-propanol to give a product having a melting point of 119–123° C. On chemical analysis the product is found to contain 60.69% C, 6.45% H, and 6.37% N, as compared with theoretical values of 60.50% C, 6.69% H, and 6.41% N.

(c) 3-(methylamino) - 1 - propyl 3-amino-4-n-butoxybenzoate hydrochloride is obtained by dissolving 13.5 g. (0.03 mole) of 3-(benzylmethylamino)-1-propyl 3-nitro-4- n-butoxybenzoate hydrochloride in 75 cc. of water and 15 cc. of alcohol and subjecting the solution to hydrogenation under a pressure of 30 pounds per square inch in the presence of 1.5 g. of 5% palladium on charcoal. Upon purifying the hydrogenated product as in Example II(b), the desired salt, after recrystallization from propanol, melts at 156–158° C. On chemical analysis the product is found to contain 56.72% C, 7.75% H, and 8.78% N, as compared with theoretical values of 56.86% C, 7.95% H, and 8.84% N.

EXAMPLE VI 3-(cyclohexylamino)propyl 3-amino-4-n-butoxybenzoate dihydrochloride

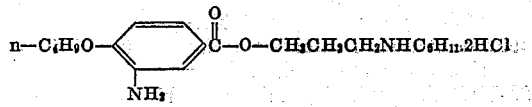

(a) 3-(cyclohexylcarbobenzoxyamino)propanol is prepared by reacting 31.4 g. (0.2 mole) of 3-(cyclohexylamino)propanol dissolved in 500 cc. of benzol and 50 cc. of dry ether and 20.2 g. (0.2 mole) of triethylamine with 34.1 g. (0.2 mole) of carbobenzoxy chloride which is added in small portions. Triethylamine hydrochloride begins to precipitate immediately. The mixture is warmed on a steam bath for several hours and filtered. After removing the solvent the residue comprising 3-(cyclohexylcarbobenzoxyamino)propanol distills at a temperature of 200–207° C. at a pressure of 6–7 mm. and has a refractive index of $n_D^{25}$ 1.5243. On chemical analysis the product is found to contain 70.08% C, 8.80% H, and 5.06% N, as compared with theoretical values of 70.06% C, 8.65% H, and 4.81% N.

(b) 3-(cyclohexylcarbobenzoxyamino)propyl 3-nitro-4-n-butoxybenzoate hydrochloride is prepared by reacting 15 g. (0.053 mole) of 3-(carbobenzoxycyclohexylamino)propanol with 0.053 mole of 3-nitro-4-n-butoxybenzoyl chloride as in Example I.

(c) 3-(cyclohexylamino)propyl 3-amino-4-n-butoxybenzoate dihydrochloride is obtained by hydrogenating a solution of 10.2 g. (0.02 mole) of 3-(carbobenzoxycyclohexylamino)propyl 3-nitro-4-n-butoxybenzoate in 100 cc. of ethyl alcohol in the presence of 1.0 g. of 5 palladium on charcoal. After reduction is complete the solution is filtered and 0.02 mole of alcoholic hydrochloric acid is added and the solution concentrated to dryness under reduced pressure. The residue is treated with acetone and filtered to yield the dihydrochloride salt having a melting point of 216° C. with decomposition. On chemical analysis the said salt is found to contain 57.40% C, 7.97% H, and 6.78% N, as compared with theoretical values of 57.69% C, 7.91% H, and 6.66% N.

EXAMPLE VII 1-(methylamino)-2-propyl 4-aminobenzoate dihydrochloride hemihydrate

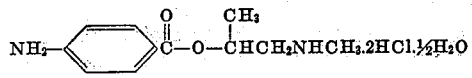

(a) 1-(benzylmethylamino)-2-propyl 4-nitrobenzoate hydrochloride is prepared by reacting 4-nitrobenzoyl chloride and 1-(benzylmethylamino)-2-propanol as prepared in Example IV(a) according to the procedure described heretofore to obtain the hydrochloride salt which melts at 206–208° C. and which has on chemical analysis, 59.41% C, 5.68% H, and 7.61% N, as compared with theoretical values of 59.20% C, 5.80% H, and 7.68% N.

(b) The product 1-(methylamino)-2-propyl 4-aminobenzoate dihydrochloride is prepared by reducing the 1-(benzylmethylamino)-2-propyl 4-nitrobenzoate hydrochloride in alcohol with palladium on charcoal as heretofore described. On chemical analysis the hemi-hydrate of the said dihydrochloride is found to contain 45.85% C, 6.59% H, and 9.82% N, as compared with theoretical values of 45.52% C, 6.60% H, and 9.64% N.

EXAMPLE VIII 2-(n-butylamino)ethyl 4-aminobenzoate hydrochloride

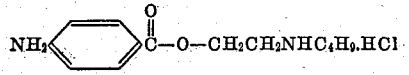

(a) 2-(benzyl-n-butylamino)ethyl 4-nitrobenzoate hydrochloride is prepared by reacting 4-nitrobenzoyl chloride and 2-(benzyl-n-butylamino)ethanol according to the procedure in Example II(a).

(b) The product 2-(n-butylamino)ethyl 4-aminobenzoate hydrochloride is prepared by hydrogenating 2-(benzyl-n-butylamino)ethyl 4-nitrobenzoate hydrochloride according to the procedure described in Example VII(b) to produce the said salt having a melting point of 140–141° C., which on chemical analysis is found to contain 57.08% C, 7.94% H, and 10.27% N, as compared with theoretical values of 57.22% C, 7.76% H, and 10.27% N.

EXAMPLE IX 2-(ethylamino)ethyl 3-amino-4-n-butoxybenzoate hydrochloride

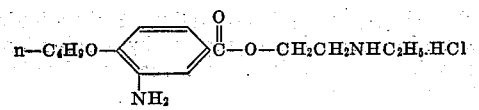

(a) 2-(benzylethylamino)ethanol is prepared by reacting 2-(ethylamino) ethanol with benzaldehyde and hydrogenating according to the procedure described in Example I(a), said ethanol product distilling at a temperature of 148–156° C. at a pressure of 22 mm. and having a refractive index of $n_D^{25}$ 1.5200. On chemical analysis the said product is found to contain 73.66% C, 9.32% H, and 7.72% N, as compared with theoretical values of 73.70% C, 9.56% H, and 7.81% N.

(b) 2-(benzylethylamino)ethyl 3-nitro-4-n-butoxybenzoate hydrochloride is prepared by reacting 2-(benzylethylamino)ethanol with 3-nitro-4-n-butoxybenzoyl chloride as in Example II(a) and has a melting point of 139–141° C. On chemical analysis the said hydrochloride is found to contain 60.69% C, 6.68% H, and 6.23% N, as compared with theoretical values of 60.50% C, 6.69% H, and 6.41% N.

(c) 2-(ethylamino)ethyl 3-amino-4-n-butoxybenzoate hydrochloride is prepared by subjecting 2-(benzylethylamino)ethyl 3-nitro-4-n-butoxybenzoate hydrochloride to hydrogenation in accordance with the procedure described in Example VII(c). The said amino product has a melting point of 128–129° C. On chemical analysis the said product is found to contain 57.10% C, 8.03% H, and 8.86% N, as compared with theoretical values of 56.86% C, 7.95% H, and 8.84% N.

EXAMPLE X 2-(isopropylamino)ethyl 3-amino-4-n-butoxybenzoate hydrochloride

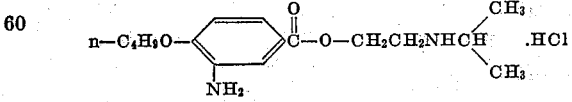

(a) 2-(benzylisopropylamino)ethanol is prepared by reductive alkylation of 2-(isopropylamino)ethanol with benzaldehyde in accordance with the procedure described heretofore and has a boiling point of 142.5–143° C., at a pressure of 22 mm. and a refractive index of $n_D^{26}$ 1.5110. On chemical analysis the said aminoethanol product is found to contain 74.63% C, 10.03% H, and 7.29% N, as compared with theoretical values of 74.57% C, 9.91% H, and 7.25% N.

(b) 2-(benzylisopropylamino)ethyl 3-nitro-4-n-butoxybenzoate hydrochloride is prepared by reacting 3-nitro-4-n-butoxybenzoyl chloride with 2-(benzylisopropylamino)ethanol in accordance with the procedure described in Example II(b), and has a melting point of 128–130° C. The said hydrochloride salt on chemical analysis is found to contain 60.20% C, 6.89% H, and 6.24% N, as compared with theoretical values of 60.47% C, 6.93% H, and 6.21% N.

(c) 2-(isopropylamino)ethyl 3-amino-4-n-butoxybenzoate hydrochloride is prepared by subjecting 2-(benzylisopropylamino)ethyl 3-nitro-4-n-butoxybenzoate hydrochloride to hydrogenation in the presence of palladium on carbon in the manner described in Example VII. The reaction product melts at 143–144° C. and on chemical analysis is found to contain 58.19% C, 8.12% H, and 8.58% N, as compared with theoretical values of 58.08% C, 8.23% H, and 8.47% N.

EXAMPLE XI 2-(n-butylamino)ethyl 3-amino-4-n-butoxybenzoate hydrochloride

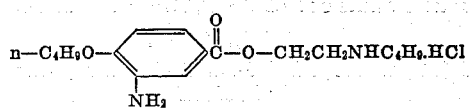

(a) 2-(benzyl-n-butylamino)ethyl 3-nitro-4-n-butoxybenzoate hydrochloride is prepared by reacting 3-nitro-4-n-butoxybenzoyl chloride with 2-(benzyl-n-butylamino)-ethanol as described heretofore.

(b) 2-(n-butylamino)ethyl 3-amino-4-n-butoxybenzoate hydrochloride is prepared by hydrogenation of 2-(benzyl-n-butylamino)ethyl 3-nitro-4-n-butoxybenzoate hydrochloride in the presence of palladium on carbon as described heretofore and has a melting point of 140–141° C. On chemical analysis the said product is found to contain 59.12% C, 8.69% H, and 8.12% N, as compared with theoretical values of 59.20% C, 8.47% H, and 8.12% N.

EXAMPLE XII 2-(n-propylamino)-1-butyl 3-amino-4-n-butoxybenzoate dihydrochloride

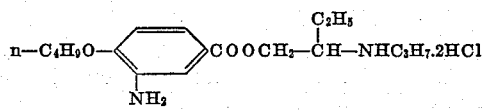

(a) 2-(benzyl-n-propylamino)-1-butanol is prepared by reductive alkylation of 2-(benzylamino)-1-butanol with propionaldehyde in accordance with the herein described procedure. The product boils at 162–167° C. at a pressure of 11 mm. and has a refractive index of $n_D^{26}$ 1.5052. On chemical analysis the product is found to contain 76.26% C, 10.39% H, and 6.53% N, as compared with theoretical values of 75.97% C, 10.47% H, and 6.33% N.

(b) 2-(benzyl-n-propylamino)-1-butyl 3-nitro-4-n-butoxybenzoate hydrochloride is prepared from the product of Example XII(a) in accordance with the previously described procedure and is obtained as a viscous oil.

(c) 2-(n-propylamino)-1-butyl 3-amino-4 - n - butoxybenzoate dihydrochloride is obtained in 63% yield by catalytic reduction of the product of Example XII (b) in accordance with the herein described procedure. The said dihydrochloride salt melts at 206–208° C. with decomposition. On chemical analysis the product is found to contain 54.63% C, 8.15% H, and 6.88% N, as compared with theoretical values of 54.66% C, 8.16% H, and 7.09% N.

EXAMPLE XIII 1-(n-propylamino)-2-propyl 3-amino-4-n-butoxybenzoate dihydrochloride

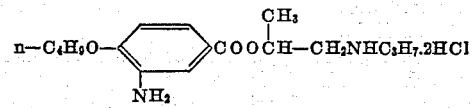

(a) 1-(benzyl-n-propylamino)-2-propanol is prepared by reductive alkylation of 1-(benzylamino)-2-propanol with propionaldehyde in accordance with the herein described procedure. The product boils at 141–143° C. at a pressure of 11 mm. and exhibits a refractive index of $n_D^{25}$ 1.5010. On chemical analysis the product is found to contain 75.12% C, 10.17% H, and 6.62% N, as compared with theoretical values of 75.31% C, 10.21% H, and 6.76% N.

(b) 1 - (benzyl - n - propylamino) - 2 - propyl 3 - nitro-4-n-butoxybenzoate hydrochloride is isolated as a thick viscous oil from the reaction of 3-nitro-4-n-butoxybenzoyl chloride with the product of Example XIII(a).

(c) 1-(n-propylamino)-2-propyl 3-amino-4-n-butoxybenzoate dihydrochloride is obtained by catalytic reduction of the product of Example XIII(b). The said dihydrochloride salt, after extensive drying, melts at 145–146° C. On chemical analysis the product is found to contain 53.58% C, 7.91% H, and 7.12% N, as compared with theoretical values of 53.53% C, 7.89% H, and 7.35% N.

EXAMPLE XIV 2-(isobutylamino)ethyl 3-amino-4-n-butoxybenzoate hydrochloride

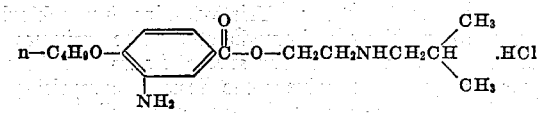

(a) 2-(benzylisobutylamino)ethanol is prepared by adding 15 cc. (0.3 mole) ethylene oxide to 49 g. (0.3 mole) N-benzylisobutylamine in a well cooled stainless steel bomb. After sealing, the bomb is heated for about five hours at 90–100° C. After distillation a product boiling at 163–170° C. under 21 mm. pressure and having a refractive index of $n_D^{25.5}$ 1.5034, is obtained. On chemical analysis the product is found to contain 75.46% C, 10.38% H, 6.66% N, and 7.84% O, as compared with theoretical values of 75.31% C, 10.21% H, 6.76% N, and 7.72% O.

(b) 2 - (benzylisobutylamino)ethyl 3 - nitro - 4 - n - butoxybenzoate hydrochloride is prepared by reacting 38.0 g. (0.183 mole) of the compound produced in Example XIV(a) in the herein disclosed manner with 0.183 mole of 3-nitro-4-n-butoxybenzoyl chloride in benzol. The product is a thick, viscous mass which is used as such for hydrogenation.

(c) 2-(isobutylamino)ethyl 3-amino-4-n-butoxybenzoate hydrochloride is prepared by catalytic reduction of an alcoholic solution of the nitro ester hydrochloride as produced in Example IV(b). After reduction is complete, the alcoholic filtrate is added to anhydrous ether and after precipitation is complete, the mixture is filtered and washed with ether. A product melting at 95–97° C. is obtained. On chemical analysis the product is found to contain 58.96% C, 8.60% H, and 7.93% N, as compared with theoretical values of 59.20% C, 8.47% H, and 8.12% N.

It will be evident from the foregoing specific examples that the present invention provides an efficient and convenient process for the preparation of monoalkylaminoalkyl esters in a highly purified form and is particularly applicable to the preparation of amino benzoates and lower alkoxy substituted amino benzoates having the general formula:

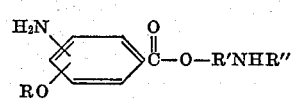

wherein R is a lower alkyl group, R' is a bivalent lower hydrocarbon radical, and R" is a lower alkyl group by reacting an alkanol having the general formula:

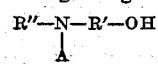

where R' and R" have the above defined values and A is a hydrogenolyzable group selected from the group consisting of benzyl, benzhydryl, α-menaphthyl, β-menaphthyl, carbobenzoxy, carbo-allyloxy, and halocarbobenzoxy, with a benzoic acid acylating agent having the general formula:

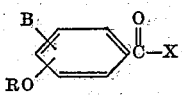

where R is a lower alkyl group, B is selected from the group consisting of the nitro and the amino groups, and X is selected from the group consisting of a halogen atom and a lower alkoxy group, preferably methoxy and ethoxy, to form an ester having the general formula:

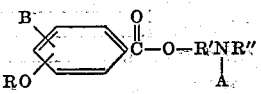

where A, B, R, R', and R" have the above defined values, thereafter subjecting the said ester to a hydrogen reducing atmosphere to remove the said hydrogenolyzable group, and recovering the said monoalkylaminoalkyl ester compound as the salt or base uncontaminated by amide products.

The monoalkylaminoalkyl ester products having the latter general structure and particularly their water soluble non-toxic salts, such as the hydrochloride, the hydrobromide, the sulfate, and the nitrate, exhibit marked local anesthetic properties.

The esters of the present invention can, of course, also be prepared by using in the foregoing general reaction as the acylating agent a lower alkoxy ester of the desirably substituted benzoic acid and effecting an ester interchange in the usual manner in the presence of an alkaline catalyst, such as sodium ethoxide.

It should be readily understood that the herein disclosed process is also useful for the preparation of other monoalkylaminoalkyl esters former by reacting an aminoalkanol with an acylating agent which forms unsubstituted benzoates, aminobenzoates, lower alkyl substituted benzoates, and halogen substituted benzoates or similar esters wherein the ester compound does not possess substituents which are adversely affected by the reducing atmosphere used to remove the hydrogenolyzable group from the nitrogen atom of the alkylaminoalkyl group.

Others may readily adapt the invention for use under various conditions of service, by employing one or more of the novel features disclosed or equivalents thereof. As at present advised with respect to the apparent scope of my invention, I desire to claim the following subject matter.

I claim:

1. A process of preparing a compound selected from the group consisting of compounds having the general formula:

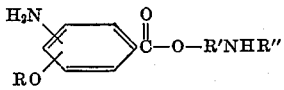

and the non-toxic salts thereof, wherein R is a lower alkyl group, R' is a lower alkylene group, and R" is a lower alkyl group, which comprises the steps of providing a tertiary amino compound having as two of the substituents on the nitrogen atom a lower alkanol group and a lower alkyl group and as the third substituent thereon a hydrogenolyzable group selected from the group consisting of benzyl, benzhydryl, α-menaphthyl, β-menaphthyl, carbobenzoxy, carbo-allyloxy, and halocarbobenzoxy to form an aminoalkanol having the general formula:

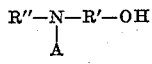

wherein R' and R" have the above-defined values and A is a hydrogenolyzable group selected from the group consisting of benzyl, benzhydryl, α-menaphthyl, β-menaphthyl, carbobenzoxy, carbo-allyloxy, and halocarbobenzoxy; reacting the said aminoalkanol with a benzoic acid acylating agent having the general formula:

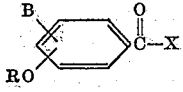

wherein R is a lower alkyl group, B is selected from the group consisting of the nitro and the amino groups, and X is a halogen atom to form an ester having the general formula:

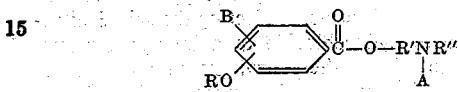

wherein A, B, R, R', and R" have the above-defined values, thereafter subjecting the said ester to a hydrogen reducing atmosphere to remove the said hydrogenolyzable group, and recovering the monoalkylaminoalkyl ester compound uncontaminated by amide products.

2. A process substantially as in claim 1 wherein the said aminoalkanol is prepared by reacting a secondary aminoalkanol having the general formula:

wherein R' is a lower alkylene group and A is benzyl with an aliphatic aldehyde.

3. A process substantially as in claim 1 wherein the said aminoalkanol is prepared by reacting a secondary amine of the general formula:

wherein R" is an alkyl group and A is benzyl with a lower alkylene oxide.

4. A process substantially as in claim 1 wherein the said aminoalkanol is prepared by reacting a secondary aminoalkanol having the general formula:

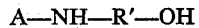

wherein R' is a lower alkylene group and A is a carbobenzoxy group with an aliphatic aldehyde.

5. A process substantially as in claim 1 wherein the said aminoalkanol is prepared by reacting a secondary amine of the general formula:

wherein R" is an alkyl group and A is a carbobenzoxy group with a lower alkylene oxide.

6. A process as in claim 1 for preparing 2-(n-propylaminoethyl) 3-amino-4-n-butoxybenzoate hydrochloride which comprises reacting 2-(n-propylamino)ethanol with 3-nitro-4-n-butoxybenzoyl chloride to form 2-(benzyl-n-propylamino)ethyl 3-nitro-4-n-butoxybenzoate hydrochloride, subjecting the said 3-nitro-4-n-butoxybenzoate hydrochloride to a hydrogen reducing atmosphere to remove the benzyl group, and thereafter recovering from the reaction mixture 2-(n-propylaminoethyl) 3-amino-4-n-butoxybenzoate hydrochloride uncontaminated by amide products.

7. A process as in claim 1 for preparing 2-(ethylamino)ethyl 3-amino-4-n-butoxybenzoate hydrochloride which comprises reacting 2-(benzylethylamino)ethanol with 3-nitro-4-n-butoxybenzoyl chloride to form 2-(benzylethylamino)ethyl 3-nitro-4-n-butoxybenzoate hydrochloride, subjecting the said 3-nitro-4-n-butoxybenzoate hydrochloride to a hydrogen reducing atmosphere to remove the benzyl group, and thereafter recovering from the reaction mixture 2-(ethylamino)ethyl 3-amino-4-n-butoxybenzoate hydrochloride uncontaminated by amide products.

8. A process as in claim 1 for preparing 3-(methylamino)-1-propyl 3-amino-4-n-butoxybenzoate hydrochloride which comprises reacting 3-(benzylmethylamino)-1-propanol with 3-nitro-4-n-butoxybenzoyl chloride to form 3-(benzylmethylamino)-1-propyl 3-nitro-4-n-butoxybenzoate hydrochloride, subjecting the said 3-nitro-4-n-butoxybenzoate hydrochloride to a hydrogen reducing atmosphere to remove the benzyl group, and recovering from the reaction mixture 3-(methylamino)-1-propyl 3-amino-4-n-butoxybenzoate hydrochloride uncontaminated by amide products.

9. A process as in claim 1 for preparing 1-(n-propylamino)-2-propyl 3-amino-4-n-butoxybenzoate dihydrochloride which comprises reacting 1-(benzyl-n-propylamino)-2-propanol with 3-nitro-4-n-butoxybenzoyl chloride to form 1-(benzyl-n-propylamino)-2-propyl 3-nitro-4-n-butoxybenzoate hydrochloride, subjecting the said 3-nitro-4-n-butoxybenzoate hydrochloride to a hydrogen reducing atmosphere to remove the benzyl group, and recovering from the reaction mixture 1-(n-propylamino)-2-propyl 3-amino-4-n-butoxybenzoate dihydrochloride uncontaminated by amide products.

10. A process as in claim 1 for preparing 2-(n-propylamino)-1-butyl 3-amino-4-n-butoxybenzoate dihydrochloride which comprises reacting 2-(benzyl-n-propylamino)-1-butanol with 3-nitro-4-n-butoxybenzoyl chloride to form 2-(benzyl-n-propylamino)-1-butyl 3-nitro-4-n-butoxybenzoate hydrochloride, subjecting the said 3-nitro-4-n-butoxybenzoate hydrochloride to a hydrogen reducing atmosphere to remove the benzyl group, and recovering from the reaction mixture 2-(n-propylamino)-1-butyl 3-amino-4-n-butoxybenzoate dihydrochloride uncontaminated by amide products.

References Cited in the file of this patent

UNITED STATES PATENTS

| | | |
|---|---|---|
| 2,288,334 | Vliet et al. | June 30, 1942 |
| 2,646,445 | Clark et al. | July 21, 1953 |
| 2,662,888 | Clinton et al. | Dec. 15, 1953 |

FOREIGN PATENTS

| | | |
|---|---|---|
| 533,012 | Great Britain | Feb. 5, 1941 |